US012789764B2

(12) United States Patent
Buchanan et al.

(10) Patent No.: US 12,789,764 B2
(45) Date of Patent: Nov. 10, 2026

(54) SECONDARY BRAKE CONTROL

(71) Applicant: Lippert Components, Inc., Mishawaka, IN (US)

(72) Inventors: Adam Buchanan, South Lyon, MI (US); Matthew Wade Haas, South Lyon, MI (US); Rudolf Arzumanov, Lake Orion, MI (US)

( * ) Notice: Subject to any disclaimer, the term of this patent is extended or adjusted under 35 U.S.C. 154(b) by 781 days.

(21) Appl. No.: 18/112,396

(22) Filed: Feb. 21, 2023

(65) Prior Publication Data

US 2023/0271595 A1 Aug. 31, 2023

Related U.S. Application Data

(60) Provisional application No. 63/312,467, filed on Feb. 22, 2022.

(51) Int. Cl.
*B60T 7/20* (2006.01)
*B60T 17/22* (2006.01)

(52) U.S. Cl.
CPC ................ *B60T 7/20* (2013.01); *B60T 17/22* (2013.01)

(58) Field of Classification Search
CPC . B60T 7/20; B60T 8/171; B60T 8/885; B60T 8/1708; B60T 8/1725; B60T 2230/06; B60T 2270/406; B60T 13/662; B60T 17/22; B60D 1/30; B60D 1/62; B60D 1/64; B60D 1/245
USPC .......................................................... 303/138
See application file for complete search history.

(56) References Cited

U.S. PATENT DOCUMENTS

| | | | | |
|---|---|---|---|---|
| 3,934,940 A * | 1/1976 | Schnaibel | ............... B60T 8/885 340/687 |
| 4,052,695 A | 10/1977 | Myers | |
| 5,899,540 A | 5/1999 | Burgdorf et al. | |
| 6,068,352 A | 5/2000 | Kulkarni et al. | |
| 7,273,260 B2 | 9/2007 | Gray | |
| 8,215,725 B2 | 7/2012 | Christopher et al. | |
| 9,550,481 B2 | 1/2017 | Tu et al. | |
| 10,277,148 B2 | 4/2019 | Hall et al. | |
| 10,829,102 B2 | 11/2020 | Schmidt-Harms | |

(Continued)

FOREIGN PATENT DOCUMENTS

| | | |
|---|---|---|
| EP | 1997703 B1 | 3/2018 |
| EP | 3333031 B1 | 5/2019 |

(Continued)

*Primary Examiner* — Robert A. Siconolfi
*Assistant Examiner* — San M Aung

(57) ABSTRACT

A system and method for configuring and controlling towed vehicle brakes via a secondary brake control system controlled by a towing vehicle primary brake controller by responding to events or errors through adoption of different structural configurations and modes of operation so that it may adapt to use different blends of input from the primary brake controller and/or a secondary brake controller of the secondary braking control system, while preventing the use of the secondary braking controller from causing errors or failsafe mode activation of the primary brake controller. Signals from the primary brake controller may be modified before they reach braking actuators of the towed vehicle, and/or the primary braking controller may be completely disconnected from the braking actuators while a dummy load simulate feedback that the primary controller needs to receive from the brake actuators.

16 Claims, 4 Drawing Sheets

(56) References Cited

U.S. PATENT DOCUMENTS

| | | | | |
|---|---|---|---|---|
| 2013/0257145 | A1* | 10/2013 | Caldeira | B60L 50/61<br>307/9.1 |
| 2014/0046565 | A1* | 2/2014 | Maitlen | B60T 8/1701<br>701/70 |
| 2019/0217831 | A1* | 7/2019 | Viele | B60D 1/245 |
| 2021/0188279 | A1* | 6/2021 | Glavinic | B60W 10/184 |
| 2021/0323519 | A1* | 10/2021 | Robertson | B60T 8/172 |

FOREIGN PATENT DOCUMENTS

| | | | |
|---|---|---|---|
| EP | 3798072 | A1 | 3/2021 |
| EP | 3093198 | B1 | 4/2021 |
| JP | 2020524112 | A | 8/2020 |
| WO | 2021081350 | A1 | 4/2021 |

* cited by examiner

SECONDARY BRAKE CONTROL

BACKGROUND

Field

This application relates generally to braking systems for towed vehicles such as trailers and, more specifically, to secondary towed vehicle braking systems that receive brake actuation command signals from a primary brake controller carried by a towing vehicle.

Description of Related Art Including Information Disclosed Under 37 CFR 1.97 and 1.98

Standard trailer braking systems are operated by a primary brake controller located in a towing vehicle. However, to improve upon the primary brake controller's obsolescence, limited features, and/or otherwise limited suitability for a particular trailer, secondary brake controllers may be used to operate the trailer brakes instead of, or to supplement, the trailer brake functions of the primary brake controller. These secondary brake controllers may be more appropriately calibrated to some aspect of a particular trailer, or they may add safety features such as improved stability control logic.

Use of these known secondary brake controllers does come with certain limitations, because the primary brake controllers generally rely on feedback from a trailer's brakes. For example, primary brake systems that use magnetic brake actuators may require feedback in the form of a predetermined resistive or inductive load characteristic value as evidence of continuity of connection to the brake actuators, without which the primary brake actuator will enter a failsafe or shutdown mode. As a result, activation of a secondary braking system may unnecessarily cripple or disable features of a primary braking system.

SUMMARY

A brake control system is provided for a towed vehicle, comprising towed vehicle brake actuators that are connected to respective towed vehicle brakes and connectable to a primary brake controller of a towing vehicle, and that are configured to actuate the towed vehicle brakes in response to brake control signals. A secondary brake controller is connectable to the towed vehicle brakes and is configured to send brake control signals to the towed vehicle brakes when connected, the secondary brake controller also being connectable to a primary brake controller carried by a towing vehicle, and configured to receive brake control signals from the primary brake controller when connected. A dummy load is connectable in communication with the primary brake controller and is configured to emulate a signature characteristic recognized by the primary brake controller as representing connection of the towed vehicle brake actuators to the primary brake controller. A signal processor is connectable between the primary brake controller and the brakes, and is configured to modify brake control signals enroute from the primary brake controller to the brakes. The system is configured to switch into and out of a dummy load configuration in which the dummy load is connected to the primary brake controller to spoof the primary brake controller into sensing connection to the towed vehicle brake actuators, the towed vehicle brake actuators are disconnected from the primary brake controller, and the secondary brake controller is connected to the towed vehicle brakes; and a chopping configuration in which the primary brake controller is connected to the brakes, and the signal processor is connected between the primary brake controller and the towed vehicle brakes where it can modify signals that are enroute from the primary brake controller to the brakes.

In addition, a method is provided for controlling the brake actuators of a towed vehicle, which comprises the steps of connecting, to the brake actuators, a secondary brake controller configured to send commands to the towed vehicle brake actuators; and connecting a primary brake controller, carried by a vehicle towing the towed vehicle, to a dummy load that prevents the primary brake controller from sensing a fault condition.

Also provided is yet another method for controlling the brake actuators of a towed vehicle, which comprises the steps of connecting brake actuators of the towed vehicle to receive commands sent from a primary brake controller carried by a towing vehicle towing the towed vehicle, and modifying the commands sent from the primary brake controller before they reach the brake actuators.

DRAWING DESCRIPTIONS

These and other features and advantages will become apparent to those skilled in the art in connection with the following detailed description and drawings of one or more embodiments of the invention, in which.

DETAILED DESCRIPTION

Figure 1:
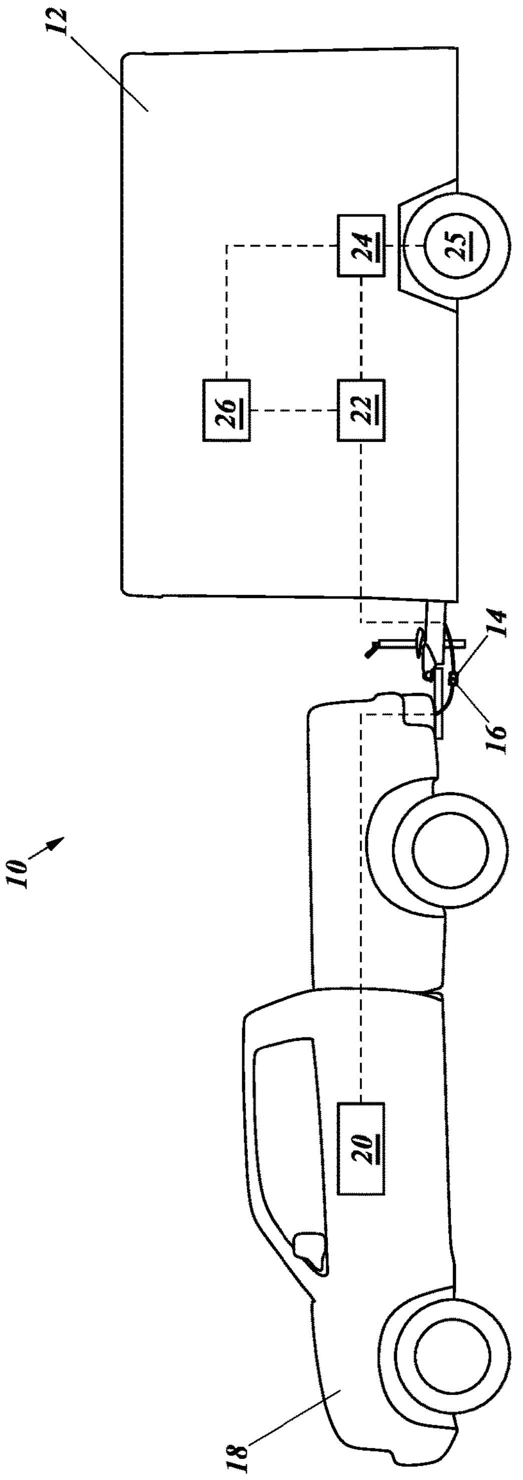
FIG. 1 is a semi-schematic side view of a secondary brake control system installed in a trailer towed by a truck carrying a primary braking controller.

The present invention addresses the problem of primary brake controller failsafe or shut-down by providing a system and method that permit a secondary brake control system to shift between configurations and modes for monitoring, modification, and/or removal/replacement of primary brake control signals, without triggering failsafes of the primary brake control system. The invention allows for smooth and rapid handoffs of brake control from one brake controller to the other, and it allows the simultaneous use of features of both the primary and secondary brake controllers, where previously the use of the secondary brake controller could cause a shutdown or failsafe of the primary brake controller.

A secondary brake control system is shown at 10 in the Figures. Different embodiments of the secondary brake control system 10 are distinguished in the Figures by the use of prime symbols after numbers that designate similar components of each embodiment. For example, 12' indicates a component of the second embodiment which, unless specified otherwise, generally matches the description of component 12 of the first embodiment. Portions of the description applying to component 12 may therefore be assumed to apply equally to component 12', except where the description of component 12' indicates otherwise.

The secondary brake control system 10 may be carried by a towed vehicle 12, such as a trailer, and may comprise a towed vehicle connector 14 that connects the secondary brake control system 10 to a primary brake controller 20 that may be located on a towing vehicle 18. The towed vehicle connector 14 may connect to the primary brake controller 20 via a compatible towing vehicle connector 16 carried by the towing vehicle 18. Connecting the towed vehicle's secondary brake control system 10 to a towing vehicle's primary brake controller 20 in this manner allows for communication between the primary brake controller 20 and the secondary brake control system 10. The secondary brake control system 10 may also include a secondary brake controller 22 that may be carried by either the towing vehicle 18 or the towed vehicle 12, brake actuators 24 that are carried by the towed vehicle 12, a dummy load 26 connectable to the primary brake controller 20, and a signal processor 28 connectable in communication with the brake actuators 24.

The primary and secondary brake controllers 20, 22 may be connectable in communication with the system's brake actuators 24. However, this communication may not always be direct, constant, or exclusive, because the system 10 may change between two or more different brake control configurations that may permit full, partial, direct, and/or indirect brake actuator control by the primary and/or secondary brake controller 20, 22. The system 10 may change between these control configurations in response to a manual input, or in response to detection of one or more predetermined conditions or criteria.

Components carried by the towing vehicle 18 and towed vehicle 12 may be connected in communication via the towed and towing vehicle connectors 14, 16. These connectors 14, 16 may comprise, for example, standard 7-way connectors. However, the vehicle connectors 14, 16 may alternatively comprise any type of trailer connectors, physical or wireless, and having any number of poles in any arrangement.

The dummy load 26 may comprise an element that provides an electrical signal or condition simulating a signal or condition that the primary brake controller 20 is configured to recognize as an indication that it is connected in communication with the brake actuators 24. For example, if the expected signal or condition comprises a resistance/inductive load provided by connection to the brake actuators 24, then the dummy load 26 may comprise components that provide an equivalent resistance/inductive load to the primary brake controller 20. In this example, if the brake actuators 24 comprise electromagnets, then the dummy load 26 may comprise a similar set of magnets switchable into connection with the primary brake controller 20 by a normally closed relay 30 that may divert the tow brake signal to the dummy load 26.

By connecting the dummy load 26 to the primary brake controller 20, the primary brake controller 20 may be disconnected from control or communication with the brake actuators 24 without detecting that connection to or communication with the actuators 24 has been lost. This allows the secondary brake controller 22 to take control of the brake actuators 24 from the primary brake controller 20, while preventing the primary brake controller 20 from interpreting an intentional removal of its direct control as a system failure or error, which could otherwise cause the primary brake controller 20 to enter a failsafe mode or take other unnecessary, undesirable, or incorrect actions.

However, even when signals from the primary brake controller 20 are diverted to the dummy load 26, the secondary brake controller 22 may remain independently connected in communication with the primary brake controller 20. The secondary brake controller's logic may therefore monitor the signals that the primary brake controller 20 is attempting to send, allowing the secondary brake controller 22 to use these primary brake controller 20 signals as input for reference or decision-making, even when the primary brake controller 20 is otherwise cut off from communication with the brake actuators 24. This may improve the capability of the secondary brake controller 22 by, for example, allowing the secondary brake controller 22 to indirectly make use of information (such as sensor data from sensors mounted on the towing vehicle 18) available only to the primary brake controller 20 by allowing the secondary brake controller 22 to monitor and react to primary brake controller 20 signals generated in response to information available only to the primary brake controller 20.

The signal processor 28 may be configured to alter brake control signals and may be connectable in communication with the primary brake controller 20 and brake actuators 24. The signal processor 28 may be connectable for communication with the secondary brake controller 22, and it preferably comprises a subcomponent or logical process of the secondary brake controller 22.

Figure 2:
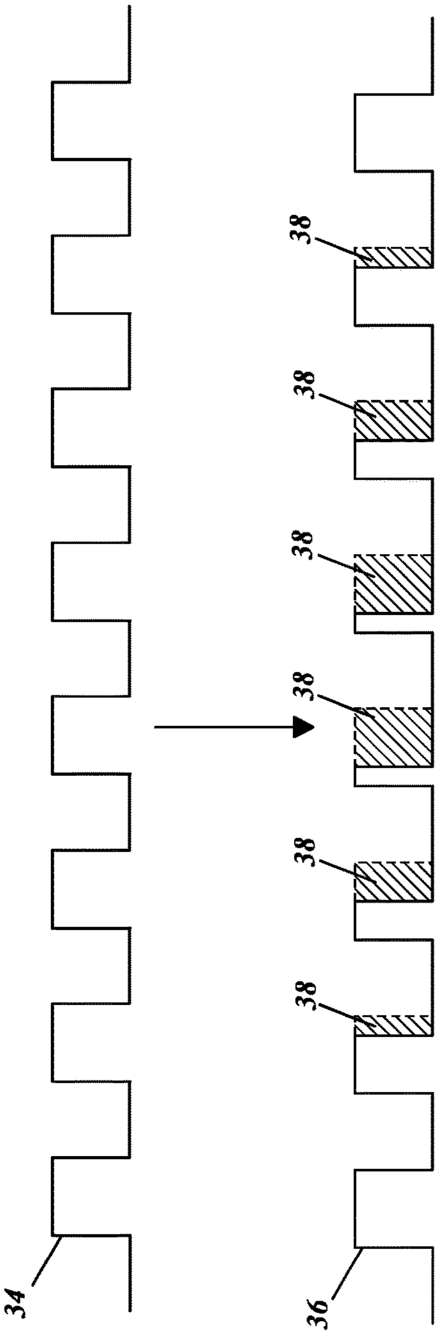
FIG. 2 is a waveform comparison view of a command signal from the primary braking controller shown before and after chopping by the secondary braking system.

The signal processor's alteration of brake signals may comprise, for example, facilitating the "chopping" of the primary brake signal in response to commands sent from the secondary brake controller 22. Chopping the signal may comprise attenuating, cancelling, or removing parts of the primary brake controller's command signals by, for example, blanking parts of a pulse width modulated signal from the primary brake controller 20 via a field-effect transistor 32 (such as a metal-oxide-semiconductor field-effect transistor). A visual representation of this signal chopping is shown in FIG. 2, which depicts an unmodified waveform of a primary brake controller command signal at 34, alongside a chopped version 36 of the same signal showing chopped portions 38 of the signal that have been negated by the secondary brake controller 22 during the chopping process. Given brake controller command signals 34, and a braking plan desired by the secondary braking system 22, the signal processor may determine and issue chopping command signals 39 configured to remove chopped portions 38 from the primary command signal 34, to produce a chopped signal 36 that corresponds to the secondary braking system's braking plan.

Figure 3:
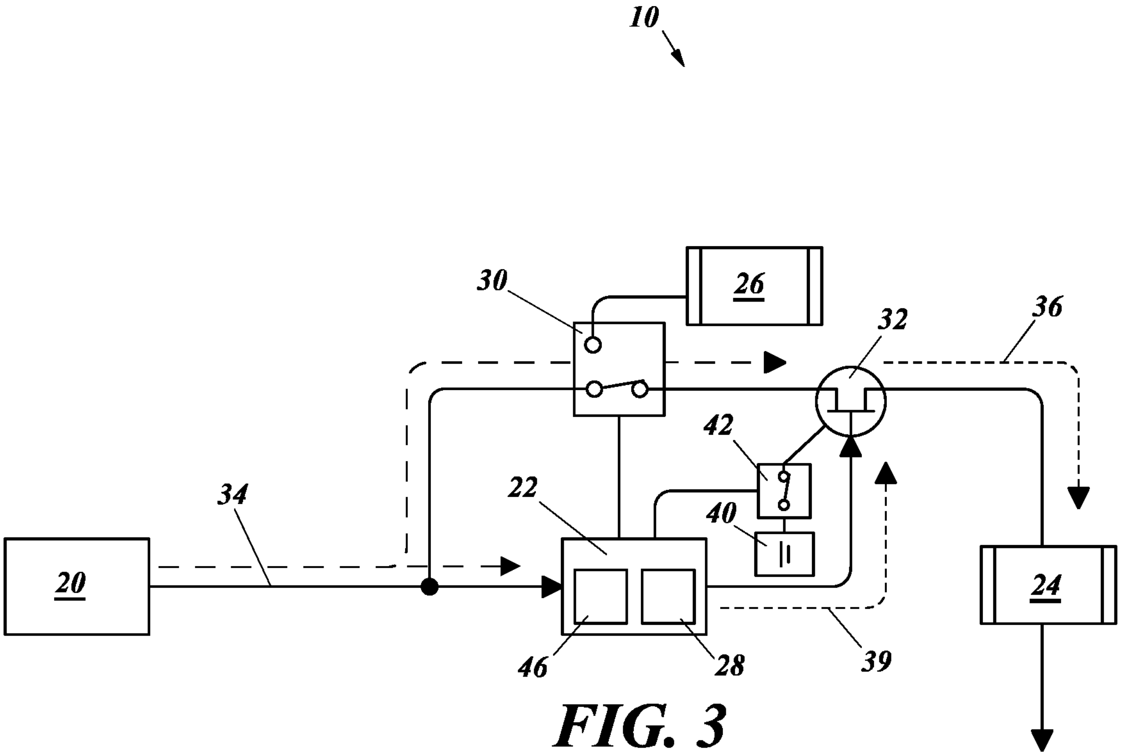
FIG. 3 is a schematic view showing a high-side chopping embodiment of the secondary braking system of FIG. 1 configured for operation in a chopping mode.
Figure 4:
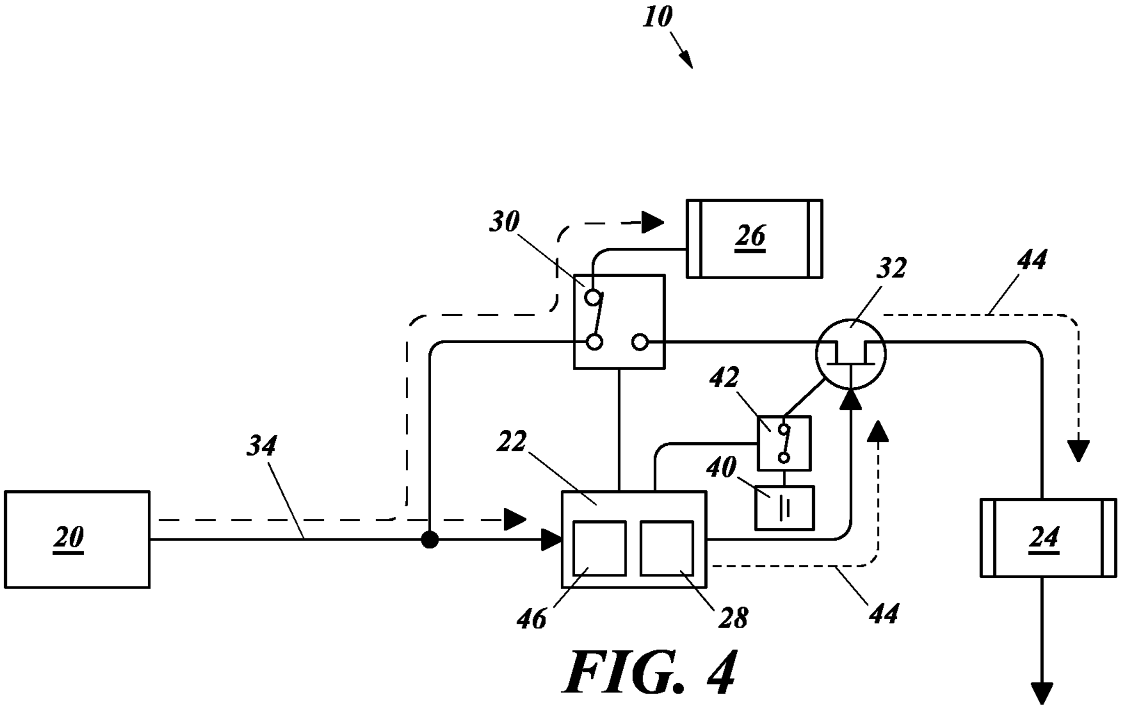
FIG. 4 is a schematic view showing the secondary braking system embodiment of FIG. 3 configured in a dummy load mode.

In the embodiment shown in FIGS. 3 and 4, brake actuator 24 may be provided chopped command signals 36 by its own respective field-effect transistor 32. The field-effect transistors 32 may be powered by one or more power sources 40, such as a 12-volt battery, and they may be connected to the power source via normally open relays 42 configured to close when the secondary brake controller 22 enters chopping mode.

Figure 5:
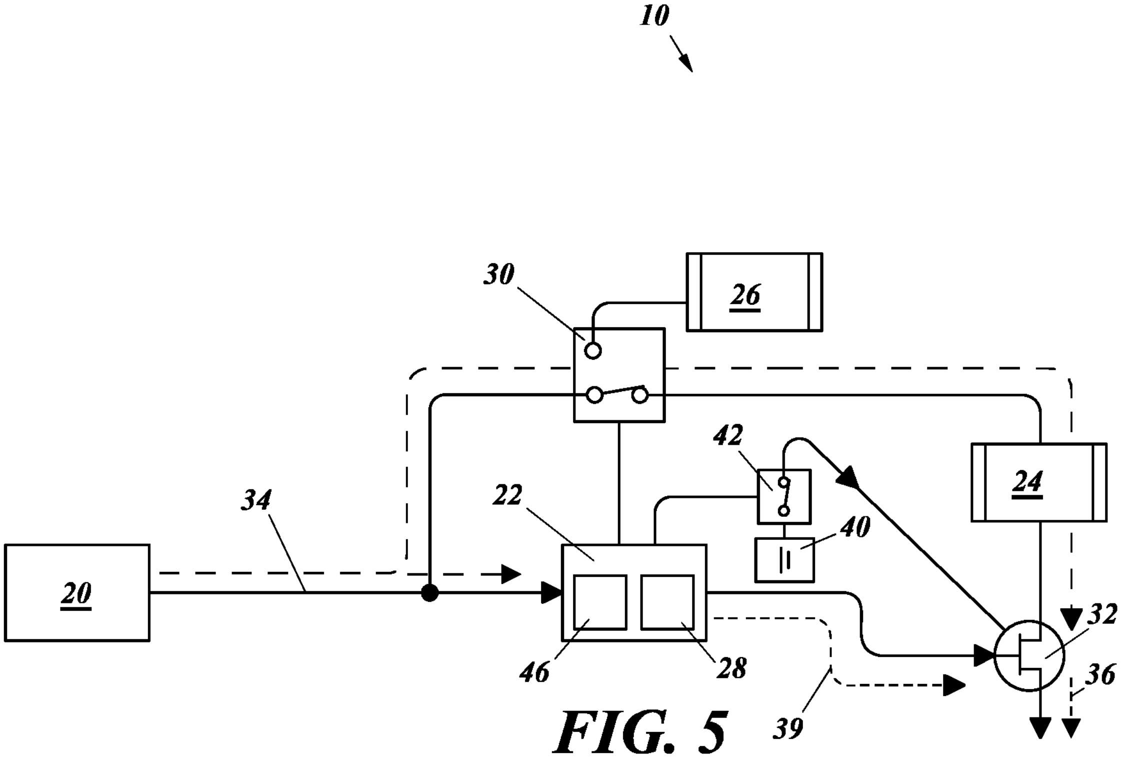
FIG. 5 is a schematic view showing a low-side chopping embodiment of the secondary braking system of FIG. 1 configured for operation in a chopping mode.

These chopping mode edits to the primary command signals 34 of the primary brake controller 20 may be carried out by alternative configurations of the system 10 in which the field-effect transistors may be located on either a "high-side" (shown in FIG. 3) or "low-side" (shown in FIG. 5) of the system 10 relative to each brake actuator 24. In the low-side embodiment, the chopping edits are made to signals moving between the brake actuators 24 and the wheel brakes 25. The chopping mode allows the primary brake controller 20 to retain control over the brake actuators 24, while allowing some features of the secondary brake controller 22 (such as antilock braking) to operate so long as they do not require driving the brake actuators 24 more than the primary brake controller 20. In other words, operating the secondary brake controller 22 in this mode ("chopping mode") will only reduce or remove portions 38 of the braking signal 34 sent by the primary controller, as shown in FIG. 2, it will not command additional braking in excess of that commanded by the primary brake controller 20.

Figure 6:
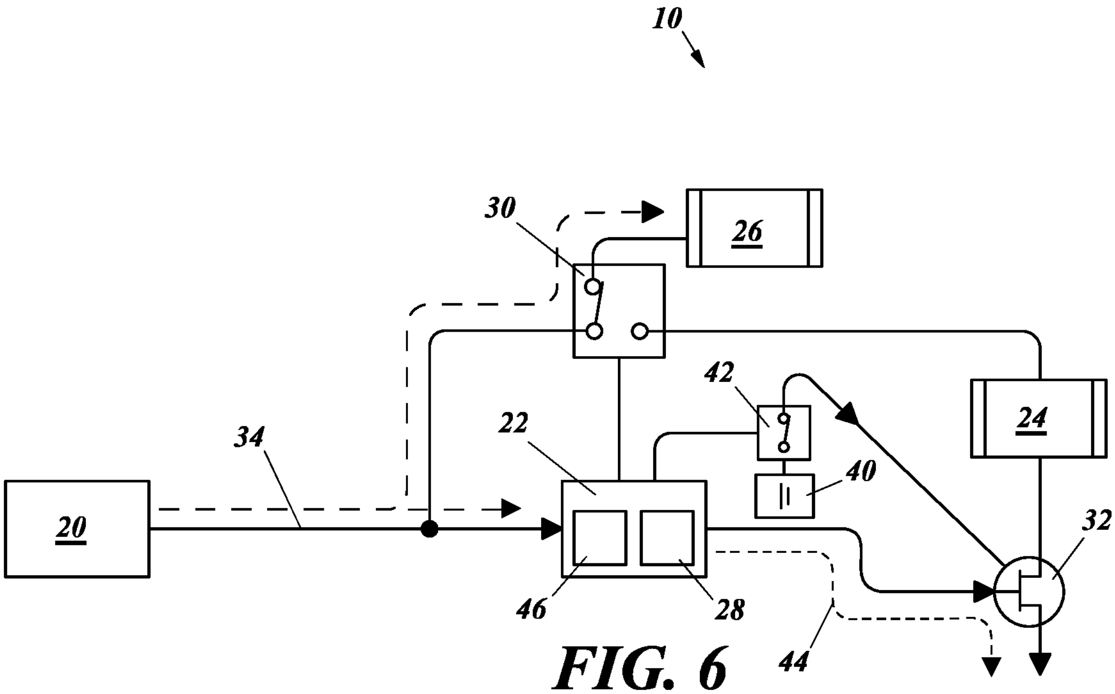
FIG. 6 is a schematic view showing the secondary braking system embodiment of FIG. 5 configured in a dummy load mode.
Figure 7:
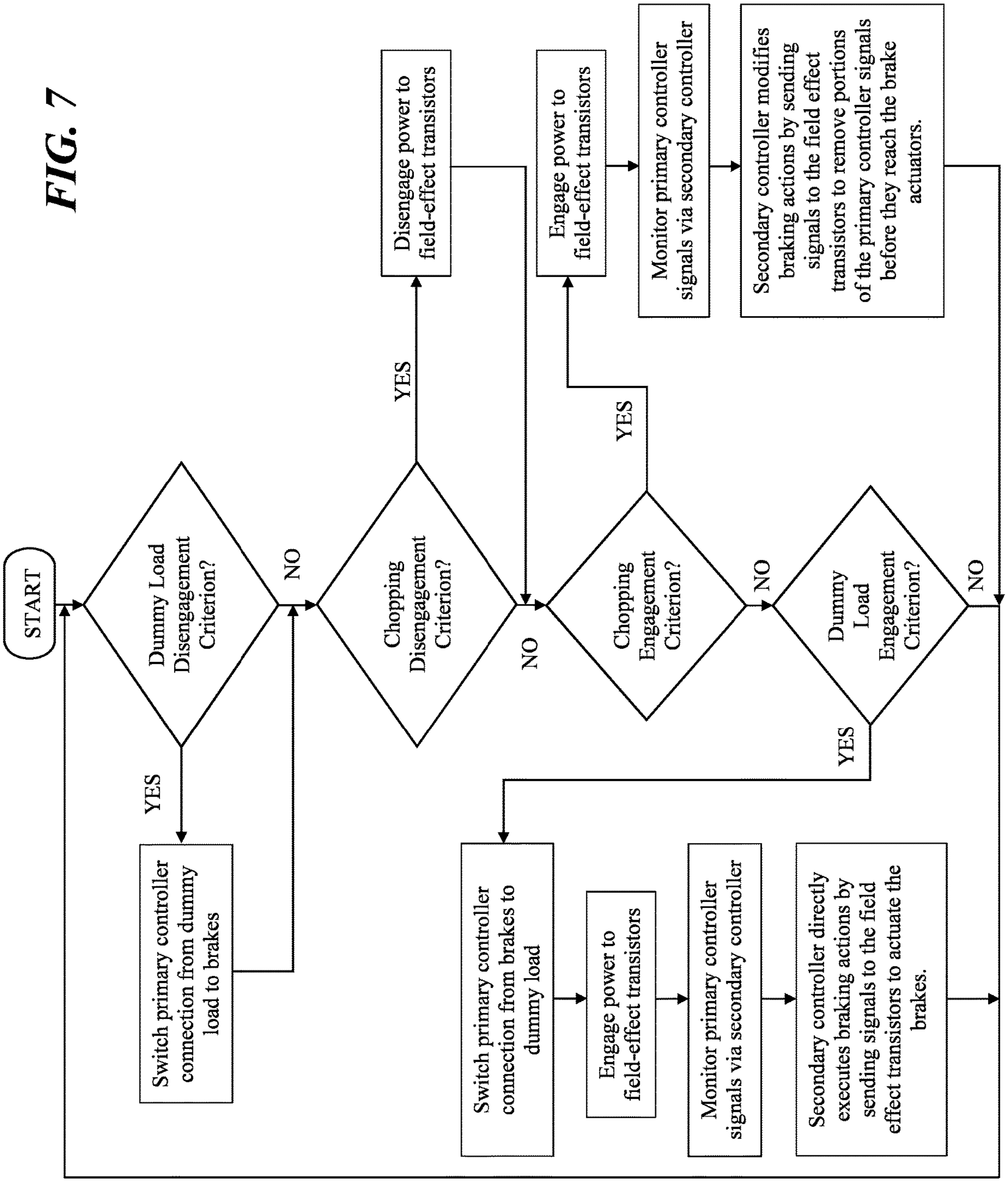
FIG. 7 is a flowchart showing a method for controlling the brake actuators of a towed vehicle.

The system 10 may be configured to connect system components according to two or more alternate brake control configurations. For example, in a dummy load configuration, shown in FIGS. 4 and 6, the dummy load 26 is connected to the primary brake controller 20, the primary brake controller 20 is disconnected from the brake actuators 24, and the secondary brake controller 22 is connected to the brake actuators 24. The primary brake controller 20 may also be connected to be monitored by the secondary brake controller 22 so that the secondary brake controller 22 may, at its discretion, ignore, relay, modify, or otherwise react to primary command signals 34 sent by the primary brake controller 20 when the secondary brake controller 22 generates its own secondary brake command signals 44. The secondary brake controller 22 may also change brake control modes in response to its analysis of primary command signals 34 sent by the primary brake controller 20. However, in this dummy load mode, none of the original primary brake control signal 34 is passed directly to the brake actuators 24, and secondary brake controller command signals 44 may be completely unrelated to the primary brake controller command signals 34.

In a chopping configuration, the primary brake controller 20 is connected to the brake actuators 24 via the signal processor 28, which is connected in a position where it can modify primary command signals 34 from the primary brake controller 20 before they reach the brake actuators 24. This modification may comprise chopping the primary signal 34, as described above, into a chopped signal 36. In a preferred embodiment of the chopping configuration, the dummy load 26 is disconnected from the primary brake controller 20, however, in other embodiments (necessitated, for example, by variations in the amount of power "chopped" from the primary brake controller 20's signals by the signal processor 28, or by the sensitivity of a particular type of primary brake controller 20), the dummy load 26 may be connected to the primary brake controller 20, at least temporarily, while the chopping configuration is in effect.

Switching between these configurations changes the system components that are connected or disconnected from communication with one another. These changes in state of connection or disconnection between system components may be accomplished by any means of inhibiting/permitting command signal transmission or relay. The switching may be established or inhibited via any suitable physical, virtual, or remote means. Accordingly, the switches and/or relays 24, 30, 42 used to make or break these connections may be any type of device suitable for quickly connecting and disconnecting the flow of communication between components of the system 10. For example, the various switches and/or relays 24, 30, 42 of the system 10 may be physical, mechanical, electrically-driven, virtual, and/or software functions of a processor through which signals pass.

In practice, the system 10 may change from one configuration to another in response to a manual input, or in response to the detection of one or more criteria. For example, the system 10 may adopt or disengage the dummy load configuration in response to predetermined dummy load engagement or disengagement criteria. Detection of a trailer sway event by a trailer electronic stability control module 46, for example, could be used as a dummy load engagement criterion. In the event that a trailer sway is detected and/or determined, the stability module 46 (which may, itself, be part of the secondary brake controller 22) might send a signal to the secondary brake controller 22, and the secondary brake controller 22 may respond by commanding activation of the brake actuators 24 to counter or attenuate the sway. While the secondary brake controller 22 assumes control of the brake actuators 24, the primary brake controller 20 may be temporarily disconnected from communication with the brake actuators 24, and the dummy load 26 may be connected to the primary brake controller 20 to prevent the primary brake controller 20 from sensing that it is no longer connected to the brake actuators 24. The dummy load configuration may then be disengaged once the secondary brake controller 22 determines that the corrective action is complete, or when the trailer sway event is no longer detected. Both conditions are examples of a possible dummy load disengagement criterion.

Similarly, the system 10 may engage or disengage the chopping configuration in response to a manual input or predetermined chopping engagement or disengagement criterion. For example, detection of a fault in the secondary brake controller 22 may be used as a chopping engagement criterion, and the system 10 may respond to detection of a secondary brake controller fault by connecting the brake actuators 24 of the towed vehicle 12 to receive commands 34 from the primary brake controller 20, connecting the signal processor 28 to the brake actuators 24 by powering up the field-effect transistors, and directing the signal processor 28 to modify the primary commands 34 sent from the primary brake controller 20, in response to commands received from the secondary brake controller 22, at a point before the primary brake controller's commands 34 reach the brake actuators 24, turning the primary brake controller's commands 34 into a chopped signal 36. Once a chopping disengagement criterion is met by, for example, correction of the fault in the secondary brake controller 22, the chopping configuration may be disengaged.

The system 10 is not necessarily limited to adopting ether the dummy load configuration or the chopping configuration. Either configuration may be engaged from other possible system 10 configurations or operation modes, or may be disengaged in favor of other configurations. For example, the system 10 may operate in a default mode and configuration, in which the primary brake controller 20 is connected for direct control of the towed vehicle's brake actuators 24, permitting an unedited primary command signal 34 to reach all the way to the brake actuators 24. In the event that the secondary brake controller 22 senses a skid or sway event occurring in the towed vehicle 12, the system 10 may adopt the dummy load configuration to allow the secondary brake controller 22 to address the event, then return the system to the default mode once the skid is corrected. In the event that the system 10 experiences a failure such as, for example, failure of the dummy load 26 to connect or operate, then the system 10 may adopt the chopping configuration as a backup, while a more serious failure may trigger reversion of the system 10 to the default mode. This default mode may have the same general physical configuration as the chopping mode, with the secondary brake controller being either disabled or merely prohibited from making edits to the primary command signal 34 via the field-effect transistors 32. However, the default mode may alternatively be accomplished by opening the battery relays 42 to disable the transistors 32 while permitting the chopping logic of the secondary braking controller 22 to continue to operate.

In practice, the brake actuators 24 of a towed vehicle 12 may be controlled by selecting between at least two brake actuator control modes (which correspond to the two system configurations described above) of a towed vehicle 12's secondary brake control system 10 in response to a mode selection criterion.

If the system 10 detects a mode selection criterion that comprises a dummy load engagement criterion, the system 10 may execute the steps of switching control of the towed vehicle's brake actuators 24 from the primary brake controller 20, to the secondary brake controller 22, and connecting the primary brake controller 20 to the dummy load 26 to prevent the primary brake controller 20 from sensing a fault condition.

If, while in the dummy load mode/configuration, the system 10 detects a mode selection criterion that comprises a dummy load disengagement criterion (or a chopping mode engagement criterion), then the system 10 may execute the steps of switching control of the towed vehicle brake actuators 24 to the primary brake controller 20, disconnecting the dummy load 26 from the primary brake controller 20, and modifying commands sent from the primary brake controller 20 before they reach the brake actuators 24 by connecting a signal processor 28 to the primary brake controller 20 and to the brake actuators 24. The signal processor 28 may modify the primary brake controller 20 commands in response to commands generated by the secondary brake controller 22.

If, while in the chopping load mode/configuration, the system 10 detects a chopping mode disengagement criterion, or a dummy load engagement criterion, the system 10 may reconfigure itself to the dummy load mode/configuration using the dummy load engagement steps above.

Alternatively, the system 10 need not switch only between the dummy load and chopping modes/configurations. If the system includes additional modes of operation, the system may respond to a dummy load or chopping disengagement criterion by disconnecting the dummy load 26 or signal processor 28, respectively, and adopting a different mode. For example, if the system detects a chopping disengagement criterion while in the chopping mode/configuration, but does not detect a dummy load engagement criterion, it may switch to the default mode by discontinuing use of the secondary brake controller 22 and signal processor 28 to modify signals from the primary brake controller 20 (and/or simply disconnecting the battery 40 from the field-effect transistors 32), and leaving the primary brake controller 20 in communication with the towed vehicle's brake actuators 24 without connecting the dummy load 26. This would allow direct and unmodified control of the brake actuators 24 by the primary brake controller 20. This example might be useful as a possible failsafe response to detection of serious damage to the secondary brake control system 10 that has caused even its chopping functions to be unusable.

A secondary brake control system 10 configured and operated as described above allows a towed vehicle to take advantage of upgraded or more advanced brake control functions without hindrance from an existing primary brake control system that would otherwise detect the operation of features like antilock braking or stability control as some type of system failure. Rather than disabling or ignoring the potentially useful or informative inputs from the old primary brake controller, this system and method provide hybrid braking system operation configurations and modes in which a secondary controller can modify the primary controller's inputs, cut the primary controller completely from control of the trailer brakes while still observing the commands that the primary braking controller is attempting to make (allowing this command data to still be used in the secondary controller's decision-making), and rapidly shift between these modes as appropriate. This allows a towed vehicle to maximize the potential benefit of features provided by both primary and secondary brake controllers.

This description, rather than describing limitations of an invention, only illustrates embodiments of the invention recited in the claims. The language of this description is therefore exclusively descriptive and is non-limiting. Obviously, it's possible to modify this invention from what the description teaches. Within the scope of the claims, one may practice the invention other than as described above.

What is claimed is:

1. A brake control system for a towed vehicle, the system comprising;

towed vehicle brake actuators that are connected to respective towed vehicle brakes and connectable to a primary brake controller of a towing vehicle, and that are configured to actuate the towed vehicle brakes in response to brake control signals;

a secondary brake controller that is connectable to the towed vehicle brakes, and that is configured to send brake control signals to the towed vehicle brakes when connected, the secondary brake controller also being connectable to a primary brake controller carried by a towing vehicle, and configured to receive brake control signals from the primary brake controller when connected;

a dummy load connectable in communication with the primary brake controller and configured to emulate a signature characteristic recognized by the primary brake controller as representing connection of the towed vehicle brakes to the primary brake controller;

a signal processor connectable between the primary brake controller and the brakes, and configured to modify brake control signals enroute from the primary brake controller to the brakes; and the system being configured to switch into and out of:

a dummy load configuration in which the dummy load is connected to the primary brake controller to spoof the primary brake controller into sensing connection to the towed vehicle brakes, the towed vehicle brake actuators are disconnected from the primary brake controller, and the secondary brake controller is connected to the towed vehicle brakes; and a chopping configuration in which the primary brake controller is connected to the brakes, and the signal processor is connected between the primary brake controller and the towed vehicle brakes where it can modify signals that are enroute from the primary brake controller to the brakes.

2. The method of claim 1 in which the step of applying the fiber orientation indicating mark comprises adding a substance to the selected composite stock panel portion.

3. The brake control system of claim 1 in which the dummy load comprises an element that simulates a load that the primary brake controller is configured to detect when connected to the brake actuators.

4. The brake control system of claim 1 including switches actuable to interconnect at least two system components selected from of the group of system components consisting of: the primary brake controller, the secondary brake controller, the brake actuators, the dummy load, and the signal processor.

5. The brake control system of claim 1 in which the secondary brake controller is connected to the primary brake controller, monitoring primary brake controller command signals when the system is in the dummy load mode.

6. The brake control system of claim 1 in which the secondary brake controller is connectable to the towed vehicle brakes via connection to the towed vehicle brake actuators, and configured to send signals to the brakes by sending them to the actuators, which communicate with the brakes.

7. The brake control system of claim 1 in which the secondary brake controller is connectable to the brakes via field-effect transistors configured to communicate with the brakes when powered.

8. A method of controlling the brakes of a towed vehicle, the method comprising the steps of;

connecting, to the brakes, a secondary brake controller configured to send signals to the towed vehicle brakes; and connecting a primary brake controller, carried by a vehicle towing the towed vehicle, to a dummy load that prevents the primary brake controller from sensing a fault condition.

9. The method of claim 8 including the additional steps of;

monitoring signals from the primary brake controller; and responding to the monitored signals from the primary brake controller by executing a step from a group of steps including changing to a different brake control mode, and issuing a signal from the secondary brake controller.

10. The method of claim 8 including the additional steps of;

detecting a dummy load disengagement criterion; and responding to detection of the dummy load disengagement criterion by;

switching control of the towed vehicle brake actuators to the primary brake controller; and disconnecting the dummy load from the primary brake controller.

11. The method of claim 10 including the additional steps of;

detecting a chopping engagement criterion; and responding to the chopping engagement criterion by modifying signals sent from the primary brake controller in response to signals sent by the secondary brake controller, before the signals of the primary brake controller reach the brakes.

12. The method of claim 11 in which the step of modifying signals sent by the primary brake controller comprises chopping the signals of the primary brake controller.

13. The method of claim 8 in which the step of connecting the secondary brake controller to the brakes comprises connecting the secondary brake controller to the brake actuators, and the secondary brake controller is configured to send signals to the brake actuators.

14. A method of controlling the brakes of a towed vehicle, the method comprising the steps of;

connecting brakes of the towed vehicle to receive signals sent from a primary brake controller carried by a towing vehicle towing the towed vehicle; and modifying the signals sent from the primary brake controller before they reach the brakes, the modification comprising chopping the signals of the primary brake controller in response to signals received from a secondary brake controller.

15. The method of claim 14 including the additional steps of;

detecting a chopping disengagement criterion; and responding to detection of the chopping disengagement criterion by discontinuing chopping of the signals from the primary brake controller.

16. The method of claim 14 including the additional steps of;

detecting a dummy load engagement criterion; and responding to detection of the dummy load engagement criterion by connecting the dummy load to the primary brake controller.

* * * * *